April 24, 1951          J. P. BOSK          2,549,958
COLLAPSIBLE CHILD'S CARRIER AND SEAT
Filed May 18, 1946          3 Sheets—Sheet 1
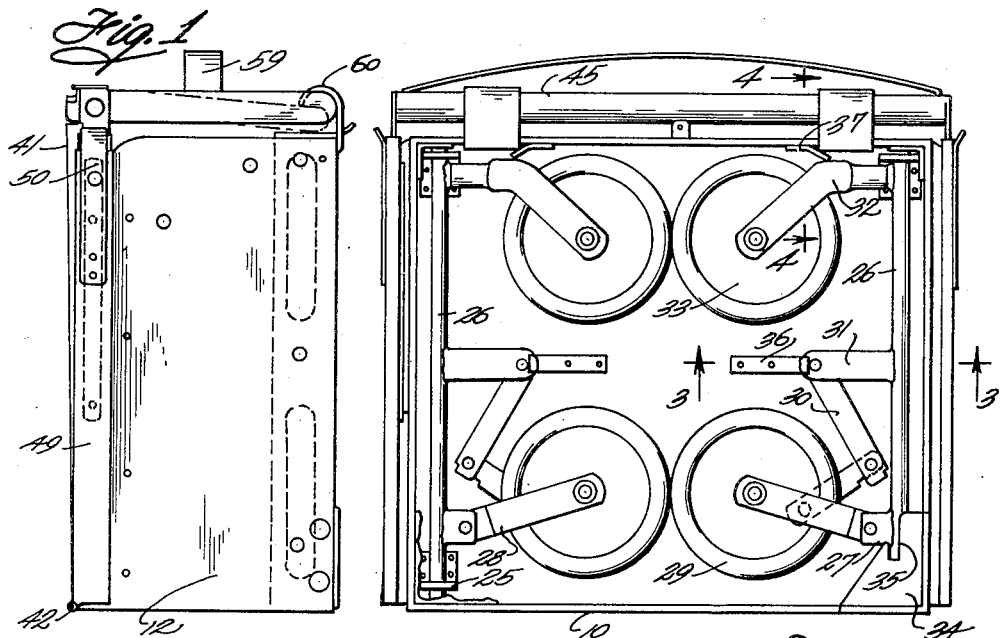
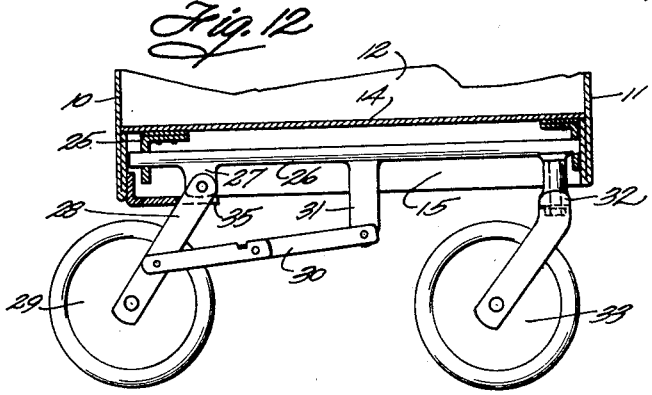
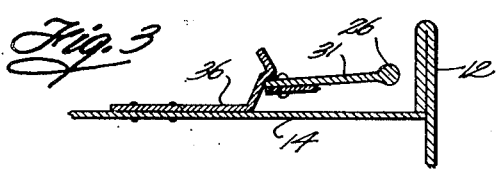
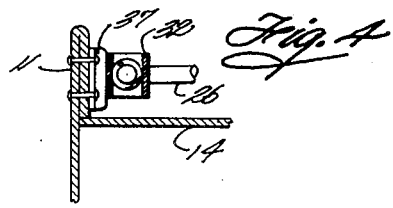
Inventor
JOHN P. BOSK
By Hazard and Miller
Attorneys April 24, 1951     J. P. BOSK     2,549,958
COLLAPSIBLE CHILD'S CARRIER AND SEAT
Filed May 18, 1946     3 Sheets-Sheet 2
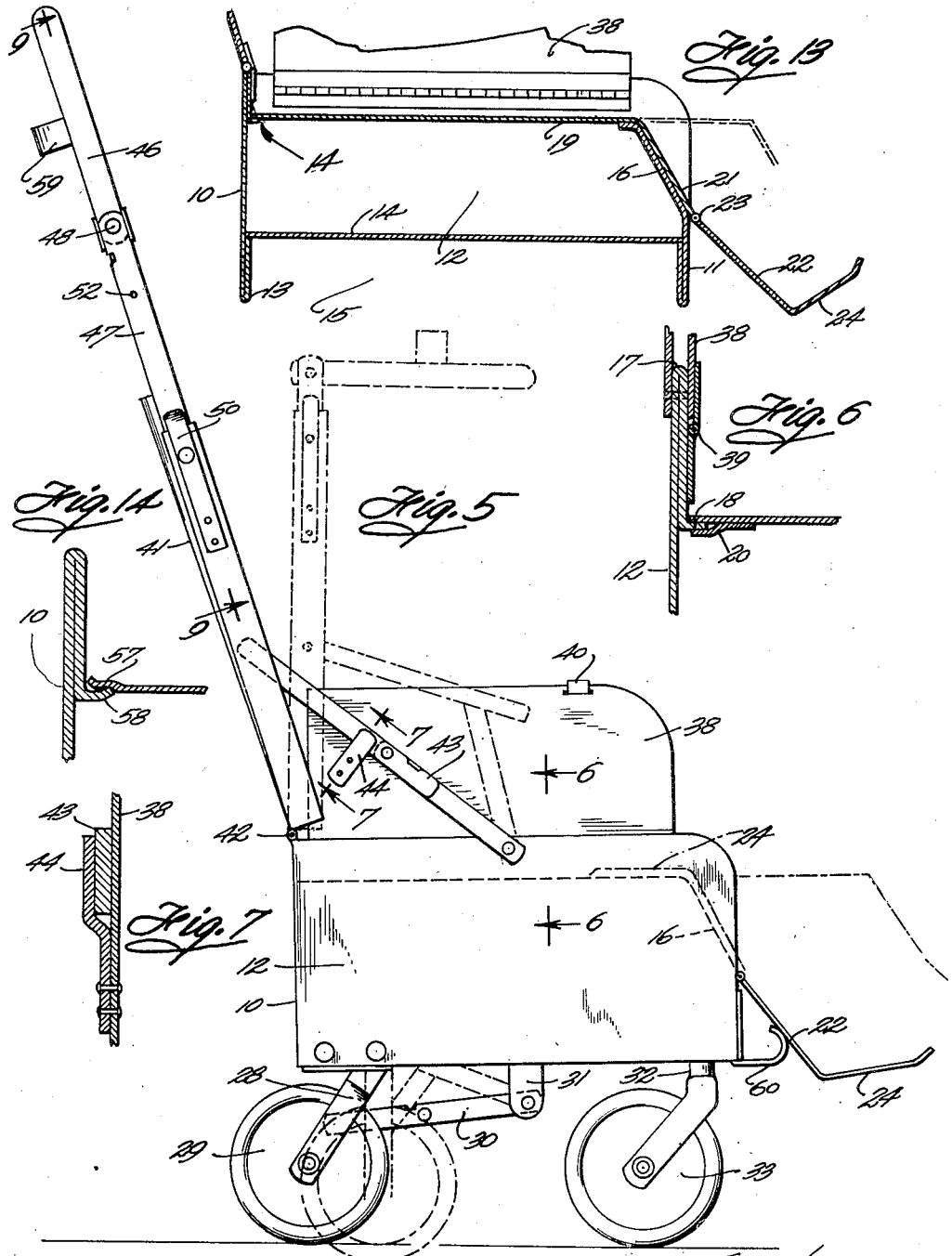
Inventor
JOHN P. BOSK
By Hazard and Miller
Attorneys

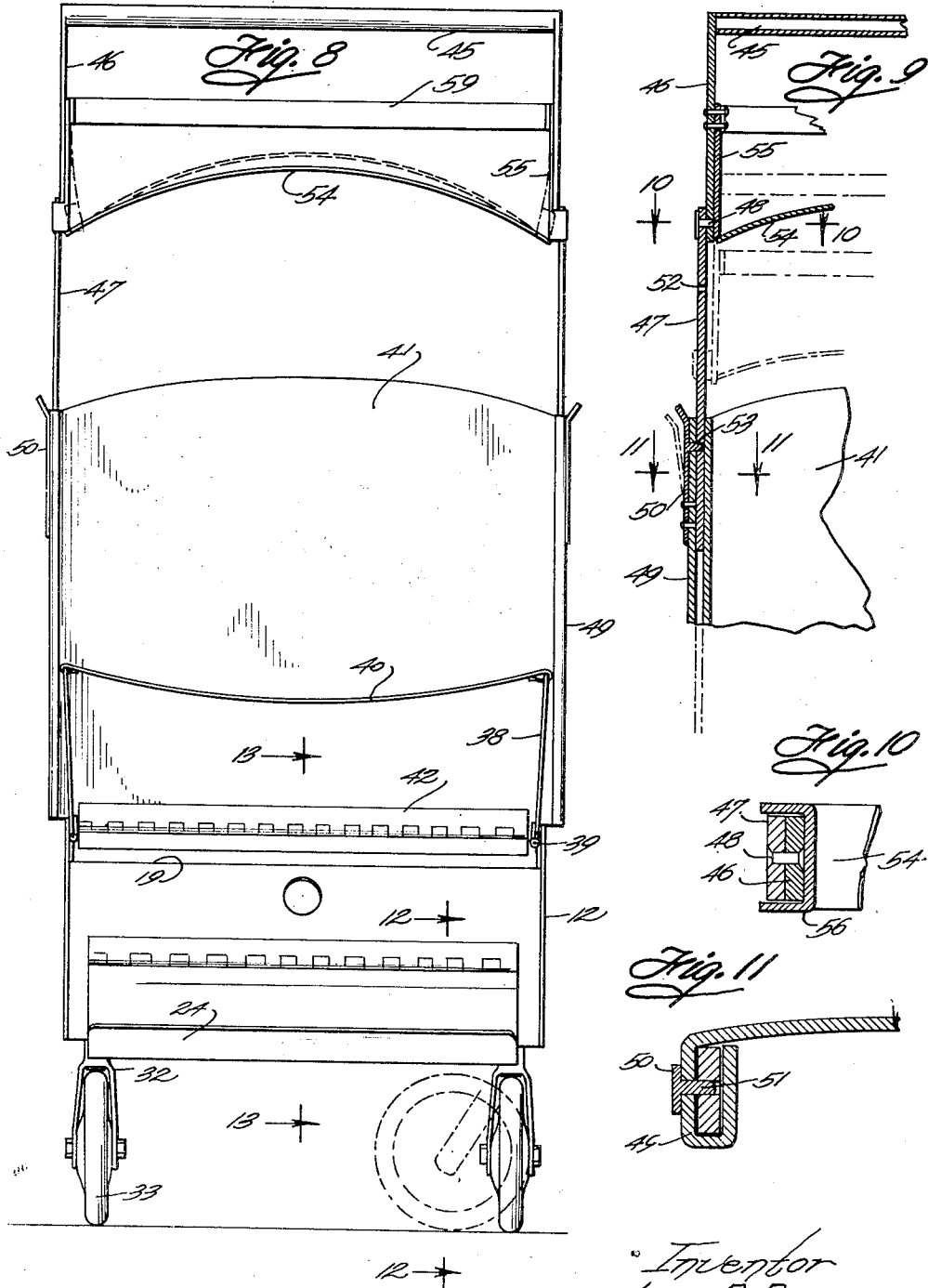

Patented Apr. 24, 1951

2,549,958

UNITED STATES PATENT OFFICE 2,549,958

COLLAPSIBLE CHILD'S CARRIER AND SEAT

John P. Bosk, Los Angeles, Calif.

Application May 18, 1946, Serial No. 670,665

14 Claims. (Cl. 280—37)

This invention relates to a collapsible carrier for small children or infants.

An object of the invention is to provide an improved infant carrier that is readily collapsible into a relatively small compact and conveniently-sized article that can be readily transported, and on reaching the destination can be readily set up to provide a wheeled body having a seat on which a child or infant may be positioned, the seat having upstanding sides and an upstanding backrest equipped with a handle by which the wheeled body may be propelled.

More specifically, an object of the invention is to provide a collapsible child carrier consisting of a body providing a seat and on the underside of which there is a recess within which rocker shafts are rotatably mounted and on which wheels and wheel mountings are mounted and to provide a means for easily and positively locking the wheels and wheel mountings in extended position as well as for retaining the wheels and their mountings in collapsed positions within the recess so that the carrier may optionally be used either as a wheeled carrier or by collapsing the wheels it may be employed as a child's seat or high chair if suitably positioned on an adequate support.

Another object of the invention is to provide a collapsible child carrier consisting of a wheeled body providing an open-topped receptacle over which a cover forming a seat is slidably mounted enabling various supplies such as feedings, diapers, or the like to be retained in the receptacle and made readily available by sliding the seat-forming cover forwardly with respect to the body.

Another object of the invention is to provide a collapsible child carrier consisting of a wheeled body providing a seat and having a backrest hingedly mounted on the body to fold over the seat and to provide sides that are hinged to the body to also be foldable over the seat, the sides being so arranged as to be engageable with collapsible braces of the backrest to retain the sides upright when the carrier is in extended position.

Another object of the invention is to provide a child carrier consisting of a wheeled body having a backrest foldable over the seat provided by the body and to provide an extensible and collapsible handle attached to the backrest which serves as a retaining means for retaining the backrest in its folded position when the carrier is completely collapsed.

With the foregoing and other objects in view, which will be made manifest in the following detailed description and specifically pointed out in the appended claims, reference is had to the accompanying drawings for an illustrative embodiment of the invention, wherein:

Figure 1 is a view in end elevation of the improved child carrier in its fully collapsed position;

Fig. 2 is a bottom plan view of the carrier in its fully collapsed position;

Figs. 3 and 4 are sectional views taken substantially upon the lines 3—3 and 4—4, respectively, on Fig. 2;

Fig. 5 is a view in side elevation of the improved child carrier in its fully extended position and illustrating in dotted lines positions assumed by some of the parts in the process of collapsing the child carrier;

Figs. 6 and 7 are sectional views taken substantially upon the lines 6—6 and 7—7, respectively, upon Fig. 5;

Fig. 8 is a view in front elevation of the child carrier in its fully extended position;

Fig. 9 is a sectional view taken substantially upon the line 9—9 upon Fig. 5;

Figs. 10 and 11 are sectional views taken substantially upon the lines 10—10 and 11—11, respectively, upon Fig. 9;

Figs. 12 and 13 are sectional views taken substantially upon the lines 12—12 and 13—13 upon Fig. 8, respectively; and Fig. 14 is an enlarged view in vertical section illustrating a portion of Fig. 13.

Referring to the accompanying drawings wherein similar reference characters designate similar parts throughout, the improved child carrier consists of a suitable body preferably formed of sheet metal shaped and formed to provide a receptacle having a front and back indicated at 10 and 11 and opposed sides 12. These walls 10, 11, and 12 are preferably reversely folded at their bottoms as indicated at 13 providing a support for a bottom 14 on the underside of which there is a recess 15 defined by the downwardly extending reversely folded portions of the body. The front wall 11 preferably slopes upwardly and rearwardly as indicated at 16. The upper portions of the side walls 12 are also preferably reversely folded as at 17, see Fig. 6, and the downwardly bent portions thereof are then bent towards each other as at 18 to provide rails for a cover 19, that provides the seat. This cover or seat is slidable on the rails and is retained thereon by means of brackets 20 secured to its underside. The forward portion of the cover is bent downwardly and forwardly as at 21 so as to overlie the sloped forward walls 16. A combined foot and leg rest 22 is hinged at 23 to the forward edge of the seat and is foldable upwardly so that the footrest portion 24 may lie against the top of the seat when in collapsed position as indicated by dotted lines on Fig. 5.

On the underside of the bottom there are suitable journals or the equivalent indicated at 25, see Fig. 2. These brackets or journals serve to rotatably mount rock shafts 26. Each of the rocker shafts has at the rear end thereof an ear 27 to which is pivotally mounted a fork or wheel mounting 28. The wheel mountings have wheels 29 rotatably mounted thereon and are equipped with collapsible knee braces 30 pivotally connected to the wheel mountings and to arms 31 that are rigidly secured to the rocker shafts intermediate their ends. At the forward ends of the rocker shafts wheel mountings 32 for caster wheels 33 are pivotally mounted on the rocker shafts. These wheel mountings are thus free to rotate in any direction with relation to the rocker shafts when they are disposed in vertical or extended positions. At the rear corners of the recess 15 the reversely bent portions 13 are connected by gusset plates 34 having notches 35 adapted to receive the upper ends of the wheel mountings 28 when the wheels are in extended positions as illustrated in Fig. 12. Thus, on rotating the rocker shafts 26 from the position shown in Fig. 2 to the position shown in Fig. 12 and swinging the wheel mountings 28 relative to the rocker shafts extending the knee braces 30, the wheel mountings will enter the notches 35 and lock the rocker shafts against rotation or collapse. As the rocker shafts are thus locked the wheel mountings for all of the wheels will be maintained in vertical position so that the wheels will support the body thereon.

In collapsing the wheels the wheel mountings 28 are merely swung forwardly collapsing their knee braces 30 and thus disengaging the notches 35 in the gusset plates. This unlocks the rocker shafts 26 and enables them to rotate relative to the brackets or journals 25 into the collapsed position shown in Fig. 2, wherein the wheels and their mountings are positioned against the underside of the bottom 14 and are completely housed within the recess 15 above the bottoms of the reverse folds 13. As a means for retaining the wheels and wheel mountings in collapsed position spring clips 36, see Figs. 2 and 3, are secured to the underside of the bottom 14 and are resiliently engageable with the ends of the arms 31. Additional spring clips 37 are secured within the walls of the recess 15 and are engageable with the wheel mountings 32 of the caster wheels 33 and serve to retain the wheel mountings 32 against rotation with relation to the rocker shafts 26. The caster wheels are thus resiliently retained within the recess.

By means of the wheel structure above described the wheels may be optionally extended as shown in Figs. 5 and 12, to support the body or collapsed entirely within the recess 15 so that if desired the structure may be positioned on any flat surface on the reversely folded portions 13 and thus serve as merely a child's seat or as a high chair.

On the inner faces of the upstanding side walls of the body collapsible sides 38 are hingedly mounted as by hinges 39 so that these sides may fold inwardly into positions overlying the seat 19. These sides when in upright positions may be connected such as by a strap or belt 40. A backrest 41 is hingedly connected as at 42 to the back of the body so as to be foldable over the inwardly folded sides 38 and into a position overlying the seat 19. This backrest is equipped with collapsible knee braces 43 that are pivotally connected to it and to the sides of the body. The sides 38 are equipped with brackets 44 that are adapted to receive the knee braces 43 when the knee braces are extended and serve to hold the sides 38 in upright positions. However, on collapsing the carrier by swinging the backrest 41 forwardly into the dotted line position shown in Fig. 5, the knee braces 43 collapse and disengage the clips or brackets 44 enabling the sides 38 to be folded inwardly over the seat. As long as the backrest is upright and the knee braces 43 are extended and are in engagement with the brackets 44 the sides 38 are held against folding over the seat.

A handle 45 is provided which is connected to the backrest 41 by means of arms to enable the child carrier to be propelled thereby. Each arm consists of two sections 46 and 47 pivotally connected together as at 48. The lower section 47 of each arm is slidable within guides 49, see Fig. 11, formed by folding the side edges of the backrest. Spring latches 50 are secured to the sides of the backrest and have pins 51 adapted to enter apertures 52 and 53 in the lower sections 47 to releasably retain the arms of the handle in extended or collapsed position. Thus, on springing the latches 50 outwardly as indicated by dotted lines on Fig. 9, the lower sections 47 of the arms may telescope into the guides 49 provided at the sides of the backrest. Conversely, on disengaging the latches the lower sections 47 may be withdrawn from the guides into extended positions and retained therein by the latches having their heads or pins 51 enter the apertures 53.

The two sections 46 and 47 of each arm are releasably locked against relative pivotal movement and to this end a flexible or resilient handle or connector 54 bridges the space between the arms. This connector is secured at its ends to leaf springs 55 fastened to the upper arm sections 46 and the springs carry U-shaped latches 56, see Fig. 10, adapted to embrace the arm sections 46 and 47 near the pivotal connection 48 and thus lock the sections against relative pivotal movement. However, on pulling the connecting member 54 upwardly the leaf springs 55 are sprung inwardly retracting the latches 56 and thus permitting the sections 46 of the arms to pivot relative to the lower sections 47.

Although the seat 19 is slidable on the rails 18 at the sides of the body its rear edge is preferably crimped as at 57, see Fig. 14, to cooperate with a retainer 58 on the back wall of the body to releasably retain the seat in closed position.

A handle 59 connects the upper sections 46 of the arms and is so arranged as to be disposed at approximately the center of the carrier when it is in fully collapsed position as shown in Fig. 1, to facilitate carrying of the device in collapsed position. At the front of the body there is provided a clip 60 beneath which the handle 45 is receivable in collapsed position to retain the backrest in collapsed position overlying the sides 38 and the seat 19.

It will be appreciated from the above-described construction that the combined leg and foot rest 22 may be swung upwardly so as to overlie the seat as indicated by dotted lines on Fig. 5. Thereafter the backrest 41 may be swung forwardly causing the knee braces 43 to buckle and disengage the clips or brackets 44. The sides 38 may then be folded inwardly to overlie the seat. By pulling upwardly on the bridging member 54 both latches 56 may be caused to simultaneously disengage and release the arms of the handle 45 to enable the upper sections 46 to be swung relatively to the lower sections. By springing the latches 50 outwardly the lower sections 47 may be telescoped downwardly within the guides 49. The backrest may then be swung forwardly to assume a position overlying the inwardly folded sides 38 over the seat 19 and the sections 46 swung downwardly to position the handle 45 so as to engage the clip 60, thus locking the handle 45 in a position that will retain the backrest in its collapsed position. When the handle 45 is thus locked not only is the backrest 41 retained in collapsed position but the underlying sides 38 and the combined leg and footrest 22 is also retained in collapsed position. Consequently, during carrying of the collapsed child carrier by the handle 59 in the position shown in Fig. 1, all of the parts are effectively locked against accidental opening. On reaching the destination the various parts above described may be extended in the reverse manner care being taken to have the sides 38 upright during the rearward swinging of the backrest 41 so that the knee braces 43 will properly enter the clips 44. The arms of the handle 45 may be withdrawn from their guides 49 and when the sections of the arms are in alignment they will be latched in this position by the automatic engagement of the latches 56 by means of the leaf springs 55. The wheels may be extended by forcibly causing the arms 31 to disengage the clips or retainers 36 and rocking the rocker shafts into a position so that the wheel mountings 28 can enter the notches 35.

From the above-described construction it will be appreciated that an improved child carrier is provided which is of relatively simple and durable construction, and which can be economically manufactured and assembled. When collapsed it may assume a very compact position and can be easily carried. When it is desired to set up the carrier either with or without wheels this can be easily accomplished and when set up the various parts are effectively locked against collapse.

Various changes may be made in the details of construction without departing from the spirit and scope of the invention as defined by the appended claims.

I claim:

1. A device of the class described comprising a body providing a seat, wheels adapted to support the body foldable beneath the seat, a backrest hingedly mounted upon the body foldable over the seat, a handle, arms slidably mounting the handle upon the backrest, said arms being jointed so as to enable the handle to be folded across the forward edge of the seat and to be fastened to the body to lock the backrest in folded position.

2. In a device of the class described, a body providing a seat, a backrest hingedly mounted upon the body so as to be foldable thereover, a handle, arms slidably mounting the handle on the backrest, means for locking the arms in extended position, said arms being jointed to enable them to fold over the forward end of the seat, and means for securing the handle to the body to lock the backrest in collapsed position.

3. In a device of the class described, a body, rocker shafts rotatably mounted upon the underside of the body, wheel mountings pivotally mounted upon the rocker shafts, knee braces collapsibly connecting the wheel mountings to their respective rocker shafts, and means on the body engageable with the wheel mounting when the rocker shafts have been rotated, and the knee braces extended to lock the rocker shafts against rotation.

4. In a device of the class described, a body, rocker shafts rotatably mounted upon the underside of the body, wheel mountings pivotally mounted upon the rocker shafts, knee braces collapsibly connecting the wheel mountings to their respective rocker shafts, there being notches in the body adapted to be entered by the wheel mountings when the rocker shafts have been rotated and the knee braces extended to lock the rocker shafts against rotation.

5. In a device of the class described, a body, rocker shafts rotatably mounted upon the underside of the body, caster wheel mountings rotatably mounted upon the rocker shafts, caster wheels rotatably mounted thereon, and resilient means on the underside of the body automatically engageable with the caster wheel mountings as the caster wheels on the rocker shaft are swung into collapsed position against the underside of the body for holding the caster wheel mountings against movement relative to the rocker shaft.

6. A device of the class described comprising a wheeled body providing an open-topped receptacle, a cover for the receptacle providing a seat, a backrest foldable over the seat, a handle on the backrest by which the body may be propelled, means for holding the backrest in upright position, and means for fastening the backrest in a position overlying the seat.

7. A device of the class described comprising a wheeled body having a seat, a backrest hingedly mounted upon the body, foldable knee braces for holding the backrest in upright position but enabling the backrest to fold forwardly over the seat, a handle on the backrest by which the body may be propelled, sides for the seat, and means on the sides engageable by the knee braces when the backrest is in upright position for holding the sides upright.

8. A device of the class described comprising a wheeled body having a seat, a backrest hingedly mounted upon the body, foldable knee braces for holding the backrest in upright position but enabling the backrest to fold forwardly over the seat, a handle on the backrest by which the body may be propelled, sides hingedly mounted at the sides of the seat foldable over in collapsed position, and means on the sides engageable with the knee braces for holding the sides in upright positions.

9. A device of the class described comprising a body providing a seat, wheels collapsible against the underside of the body, sides hingedly connected to the body at the sides of the seat foldable thereover, a backrest hingedly connected to the body at the back of the seat foldable over the sides, means for holding the backrest and sides in upright positions, and means for holding the backrest in a position overlying the sides and seat in collapsed position.

10. A device of the class described comprising a body providing a seat, wheels collapsible against the underside of the body, sides hingedly connected to the body at the sides of the seat foldable thereover, a backrest hingedly connected to the body at the back of the seat foldable over the sides, means for holding the backrest and sides in upright positions, and means for holding the backrest in a position overlying the sides and seat in collapsed position, said seat being slidable upon the body and the body providing a receptacle therebeneath.

11. A device of the class described comprising a body providing a seat, wheels collapsible against the underside of the body, sides hingedly connected to the body at the sides of the seat foldable thereover, a backrest hingedly connected to the body at the back of the seat foldable over the sides, means for holding the backrest and sides in upright positions, and means for holding the backrest in a position overlying the sides and seat in collapsed position, and a footrest hingedly connected to the forward end of the seat foldable rearwardly over the seat beneath the sides.

12. In a device of the class described, a wheeled body providing a seat, a backrest hingedly connected to the body foldable over the seat in collapsed position, a handle by which the body may be propelled, said handle having arms at the sides thereof by which it is connected to the backrest, said arms being divided into pivotally connected sections, and means for optionally locking said sections against pivotal movements or unlocking said sections for pivotal movements, said arms being adapted to slide upon said backrest.

13. In a device of the class described, a wheeled body providing a seat, a backrest hingedly connected to the body foldable over the seat in collapsed position, a handle by which the body may be propelled, said handle having arms at the sides thereof by which it is connected to the backrest, said arms being divided into pivotally connected sections, and means for optionally locking said sections against pivotal movements or unlocking said sections for pivotal movements, comprising latches adapted to engage the sections adjacent their pivotal connections, and flexible means connecting the latches for simultaneously retracting them.

14. A device of the class described comprising a wheeled body providing a receptacle, a seat slidable over the top of the receptacle, a combined leg and foot rest hingedly connected to the seat and foldable thereover, a backrest hingedly connected to the body and foldable over the seat, means for maintaining the backrest in upright position, and means for fastening the backrest to the body in its collapsed position overlying the seat.

JOHN P. BOSK.

REFERENCES CITED

The following references are of record in the file of this patent:

UNITED STATES PATENTS

| Number | Name | Date |
| --- | --- | --- |
| 324,617 | Walsh | Aug. 18, 1885 |
| 573,303 | Shaw | Dec. 15, 1896 |
| 871,483 | Dann | Nov. 19, 1907 |
| 1,125,756 | Spofford | Jan. 19, 1915 |
| 1,503,714 | Schnipper et al. | Aug. 5, 1924 |
| 2,436,643 | Hafner | Feb. 24, 1948 |

FOREIGN PATENTS

| Number | Country | Date |
| --- | --- | --- |
| 724,016 | France | Jan. 23, 1932 |